UNITED STATES PATENT OFFICE.

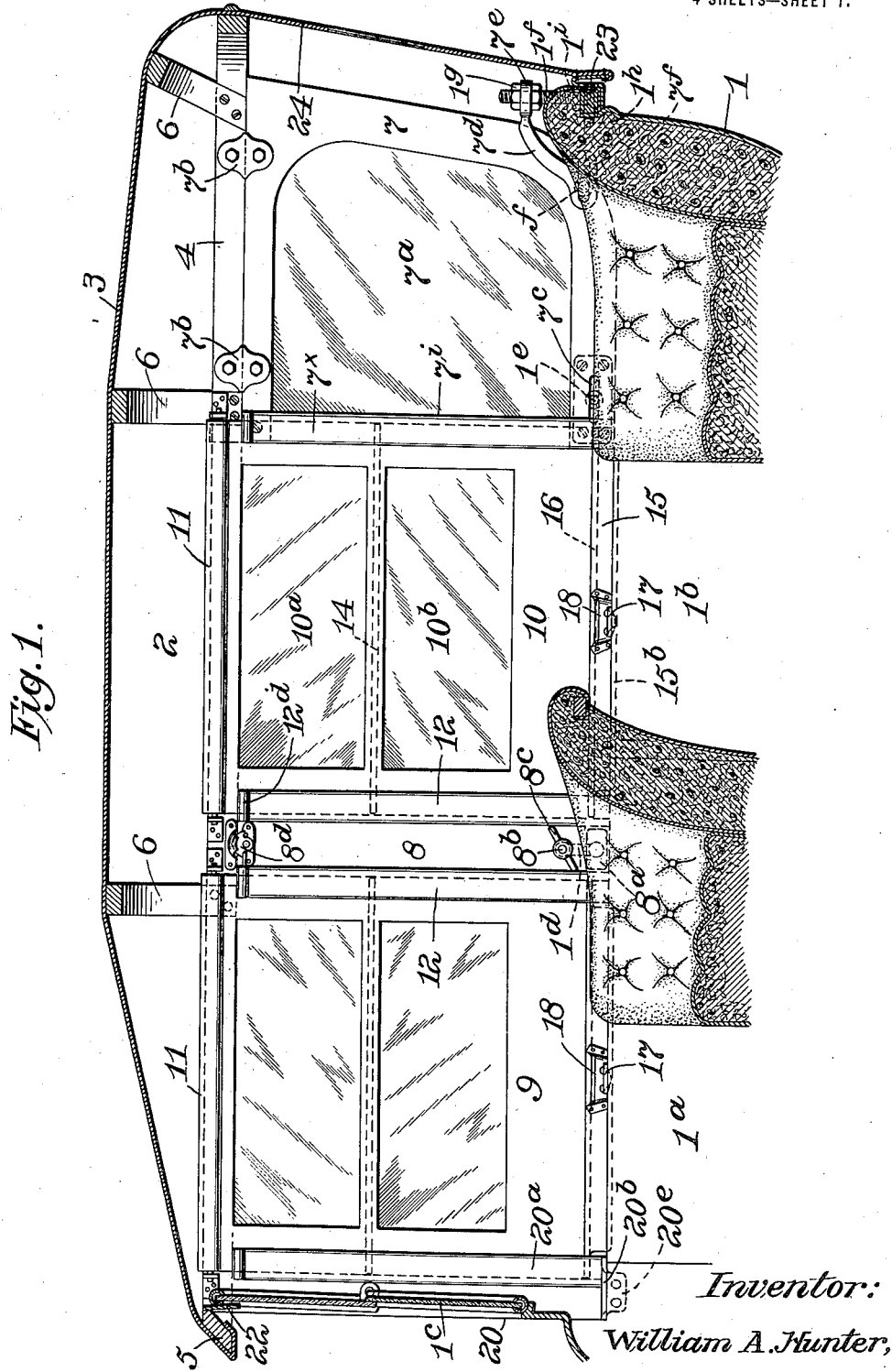

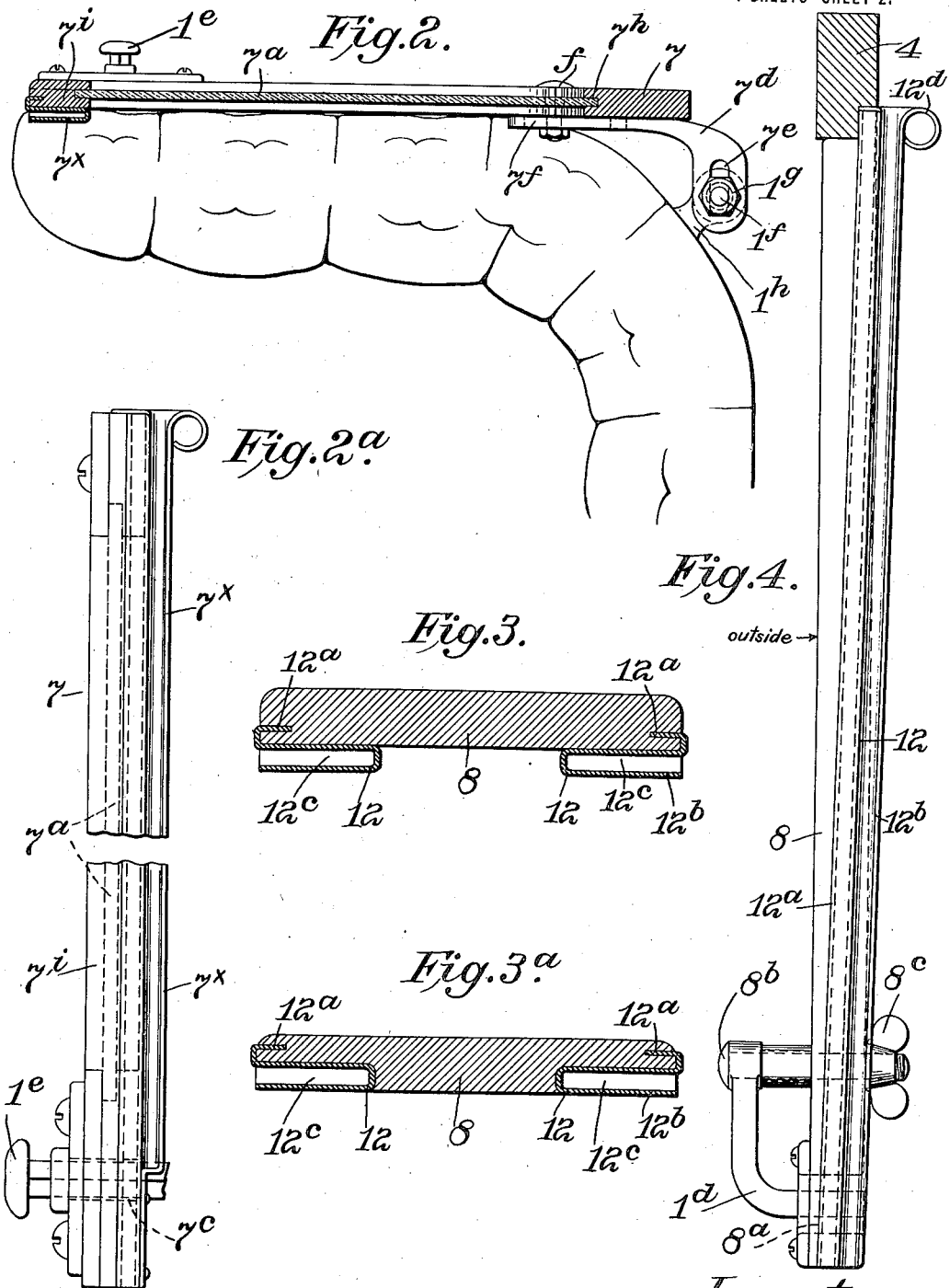

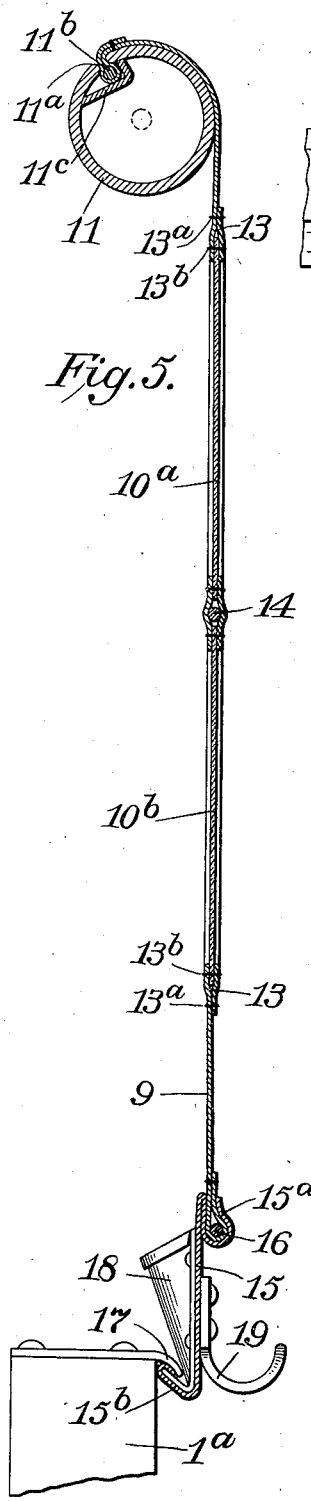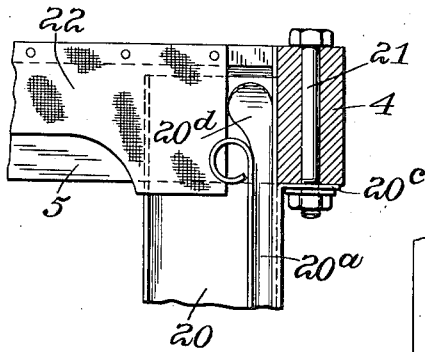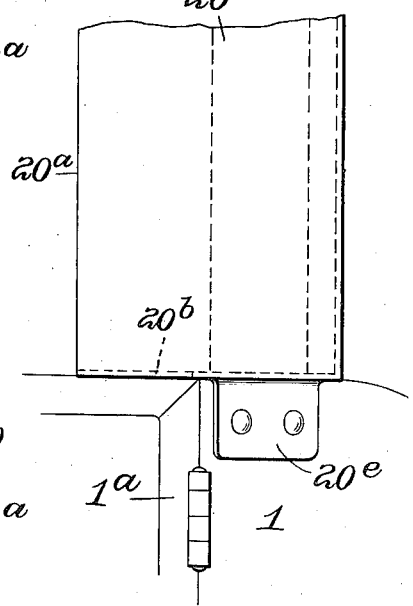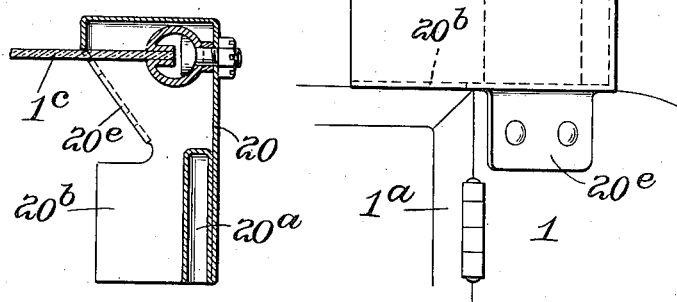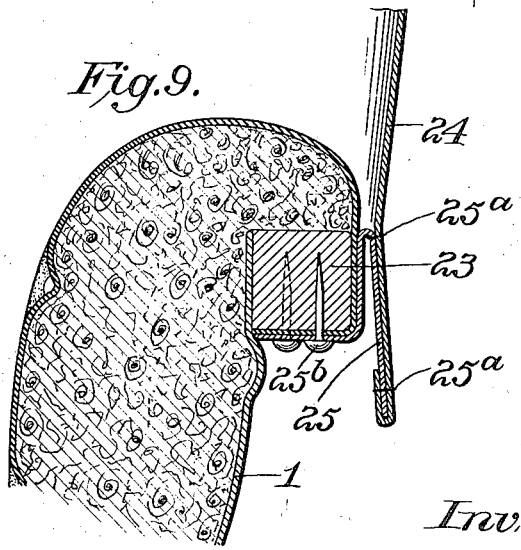

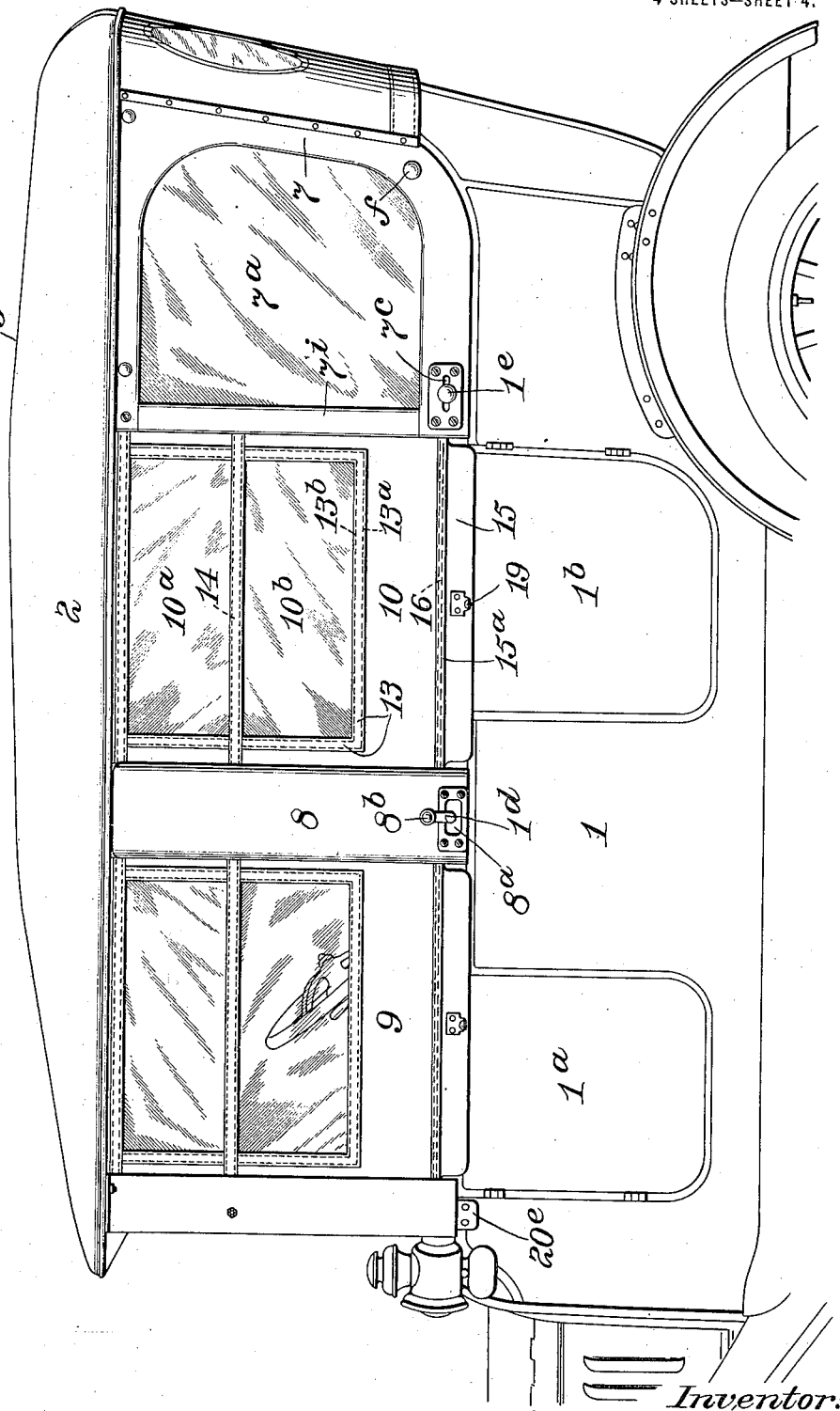

WILLIAM A. HUNTER, OF TERRE HAUTE, INDIANA, ASSIGNOR TO DELLA R. HUNTER, OF TERRE HAUTE, INDIANA.

STORM-TOP FOR MOTOR-VEHICLES.

1,323,695.     Specification of Letters Patent.     Patented Dec. 2, 1919.

Application filed March 7, 1916. Serial No. 82,671.

*To all whom it may concern:*

Be it known that I, WILLIAM A. HUNTER, a citizen of the United States, residing at Terre Haute, Indiana, have invented certain new and useful Improvements in Storm-Tops for Motor-Vehicles, of which the following is a specification.

My present invention relates to improvements in what may be termed storm tops for motor vehicles.

Among the objects of the invention are first to provide a storm top which may be readily attached to and disconnected from the motor vehicle and which when unapplied thereto may be knocked down into a compact form for shipping, thus necessitating a minimum amount of storage space in the freight car and which may be quickly and easily put into condition for application to the motor vehicle by the purchaser.

Other objects are to provide various improved features of construction having special objects in view, which will more fully hereinafter appear.

The invention includes the novel features of construction and arrangement and combination of parts hereinafter described, the invention being defined by the appended claims.

An embodiment of my invention is illustrated in the accompanying drawings in which, Figure 1 is a view of the inner side of the storm top, some parts being shown in section.

Fig. 2 is a plan view, partly in section of one of the rear side panels and a portion of the rear part of the vehicle body and with the means for connecting them.

Fig. 2ª is a view of the detachable rail of the rear panel.

Fig. 3 is a sectional plan view of the middle post with its curtain guides.

Fig. 4 is a side view of one of the middle posts and a post of the top rail in section with one of the curtain guides in place.

Fig. 5 is a view in section of one of the curtains and a part of the door to which it is connected detachably at its lower end.

Fig. 6 is a view partly in section of the upper corner of the storm top looking from the inner side thereof with the top rail in section.

Fig. 7 is a sectional plan view of the front post shown in Fig. 6.

Fig. 8 is a detail outside view showing how the post of Figs. 6 and 7 is attached to the vehicle body at its lower end.

Fig. 9 is a detail sectional view showing how the rear curtain is attached.

Fig. 10 is a side elevation.

In the drawings I have shown my invention as embodied in a top adapted more especially for a 1915 Ford automobile but it will be understood that while certain features as illustrated may be more especially adapted to this motor car as at present designed, the invention is not limited to such use but is adaptable to any touring or roadster car body of the standard type with such changes in dimensions or design as circumstances may require.

Referring by reference characters to these drawings, the numeral 1 designates the body of the touring car, having the usual front and back doors 1ª and 1ᵇ and wind shield 1ᶜ. The storm top is designated as a whole by the numeral 2 and its upper part comprises frame members supporting the top covering 3. Such frame members comprise a top horizontal rail 4, preferably formed as a continuous piece curved at the rear to conform to the curve of the back end of the body and extending forwardly to the upper corners of the wind shield, where its ends connect in a suitable manner with a transverse hood member or front cross bar 5. A plurality of bows 6, having their ends secured to the rail 4, serve to support the covering 3 in its proper arched form, said covering having its edges secured to the rail 4 and front cross bar 5, in any suitable manner.

Touring car bodies generally and especially those of the Ford type, are equipped with front and rear projecting "goose neck" irons 1ᵈ and 1ᵉ and socket irons 1ᶠ at the extreme rear of the body, the irons 1ᵈ and 1ᵉ serving to support the bow standards of the ordinary folding top and the socket irons 1ᶠ carrying hangers, serving to support the said bow standards and top when the same has been folded.

I have designed my improved storm top so as to utilize these irons as supporting and connecting means for the storm top. To this end I provide rear quarter members and intermediate posts 7 and 8, adapted for detachable connection respectively to the said irons, of the vehicle body and to the top rail, the detachable connections to the top rail being for the purpose of enabling the storm top to be knocked down for storage and shipping purposes.

Referring first to the rear members 7, I form these of a substantially C-shape, leaving a wide space in each which is occupied by a pane of glass, as indicated at $7^a$.

Each quarter member 7 is detachably connected to the top rail by means of bolts passing through suitable plates indicated at $7^b$, and its lower front part is provided with an opening $7^c$, to receive the goose neck iron $i^e$ hereinbefore referred to. The rear lower part of the quarter member is supported by a bracket iron or member $7^d$, which has its rear end provided with a horizontal slotted portion $7^e$, designed to be clamped to the iron bolt $1^f$ by nuts $1^g$ and its front portion provided with a slot or opening $7^f$ is secured by a bolt $f$ to the quarter member.

Bolt $1^f$ is passed through the socket iron $1^h$ and is held in position by a nut $1^i$, which draws the tapered head of the bolt into the tapered opening of the socket iron, it being understood that this socket iron is that carrying the hanger on which the ordinary folding top rests, when folded back.

The body irons or brackets $1^e$ and $1^h$ vary in their relative positions on different bodies and to allow for their being at different distances apart, I make the opening $7^c$ of elongated form as shown, and also the openings $7^e$ and $7^f$. The openings $7^f$ allow for adjustment lengthwise of the body, the slots $7^e$ for adjustment transversely of the body and the lock nuts on the threaded portion of the bolts $1^f$ allow for vertical adjustment. Thus by the use of these body irons 7 constructed and arranged as shown, I am enabled to secure an adjustment in three directions, thereby enabling the panels to be accurately fitted to any body.

I have referred to the open space of the C-shape quarter member as being occupied by a glass pane. The use of glass at this point is desirable, as it is at a point where folding is not required and where a wide and uninterrupted space is desirable for a clear vision for the occupants of the rear seat.

Glass however, while more desirable, is liable to be broken and to enable the broken glass to be removed and renewed without removing the whole side panel or frame I set the glass in a groove or channel $7^h$, into which it may be slid and held by a removable bar or member $7^i$, this bar being removably bolted to the arms of the C-shaped quarter member 7. This bar carries a curtain guide $7^x$.

The member or post 8 which connects the intermediate portion of the top rail with the "goose neck" or body iron $1^d$ is detachably connected with said body iron at its lower end and with said top rail at the upper end. This double detachable connection not only enables the post 8 to be removed for packing into a compact space for storage or shipping but also enables its removal at seasons when a storm closure is not necessary; for it will be readily seen that this post or member is not necessary as a support for the top rail, the latter being sufficiently supported by the rear quarter members and by front connections adjacent the wind shield, so that by the removal of the post 8 an unobstructed view from the inside may be secured.

My preferred manner of connecting this post is to provide it at its lower end with an elongated slot $8^a$, which slips over the iron $1^d$. These irons are provided with eyes which receive the bolts or pintles of the front bow standards of the ordinary folding top and through such eyes I pass bolts $8^b$, passing through openings in the posts 8 and being secured on the inside by wing nuts $8^c$.

The upper end of the post I prefer to secure to the horizontal top rail by a detachable lock indicated at $8^d$, which may conveniently take the form of a fastener of the type used for securing the meeting rails of window sashes, having a cam clamping action, which tends to draw the parts tightly together and prevent any rattling. Two pairs of side curtains are used one pair on each side, one pair indicated at 9 and 10, the front curtains 9 affording access to the front seat and the rear curtains 10 to the rear seat.

These curtains are formed of flexible material and preferably are provided with two transparent lights of flexible material, indicated at $10^a$ and $10^b$, the curtains being mounted on spring rollers 11 of the ordinary or any desired type, such as used for window shades and also in motor vehicle storm top construction. I prefer to make the rollers of cylindrical sheet metal formed with an elongated slot $11^a$, through which the upper edge of the curtain is passed and a desirable manner of securing such edge in the slot is to provide the edge with a loop or pocket, into which a holding wire or rod $11^b$ may be inserted longitudinally after said pocket has been passed through the slot, the rod being of such diameter as to prevent its being pulled through the slot. A bridge piece $11^c$ bridges the slot on the inside and forms the recess in which the pocketed portion of the curtain edge rests. The curtains are guided in their up and down movement by curtain grooves or guides 12. These are shown as in the form of sheet metal strips, doubled upon themselves to provide parallel longitudinal flanges. One of these flanges 12$^a$ is comparatively short and is set into a kerf or groove in the edge of the panel, while the other flange 12$^b$ provides between itself and the body of the strip a guiding groove or channel 12$^c$, to receive the edge of the curtain. The upper edge of the portion 12$^b$ is rolled over upon itself, as indicated at 12$^d$ to form a finishing bead and also by its rounded edge a guide to facilitate the entrance of the curtain when it is drawn down.

In order to avoid any space being left between the lower edge of the curtain and the body or door at the lower edge of the storm top I incline each guide outwardly to the plane of the panel, as indicated in Fig. 4, so that by the time the lower edge of the panel is reached the flanges 12$^b$ of the guides will lie approximately flush with the outer face of the panel. The panels are preferably connected to the horizontal top rail by a flush joint formed by overlapping rabbeted portions, as indicated in Fig. 4.

The curtains are preferably constructed in detail as shown in Fig. 5, in which the body of the curtain has strips 13 secured thereto by rows of stitches 13$^a$, leaving spaces or grooves in which the edges of the celluloid sheets are inserted, being held therein by rows of stitches 13$^b$.

At the central portion of the curtain between the two lights, I insert a metal rod 14, which serves to stiffen the curtain at this point and prevent its bagging, the ends of this rod sliding in the guides, holding curtain edge in the guide. The lower edge of the curtain is provided with a reinforcing and finishing strip 15, preferably formed of sheet metal and having one edge doubled back upon itself and grooved to form a channel with a restricted mouth, as indicated at 15$^a$, into which channel the lower edge of the curtain is inserted and held therein by a rod 16 inserted in a loop or pocket formed in the lower edge of the curtain, which rod is of greater thickness than the passage into the socketed portion 15$^a$. This strip 15 has an inwardly and upwardly turned flange or portion 15$^b$, which is adapted to engage with a hook or retaining device 17 secured to the top of the door, said strip 15 also carries an inside handle 18 and an outside handle 19, so that the curtain may be drawn down either from the inside or outside sufficiently to release the curtain and allow the spring to wind it up.

The top is supported at the front by two corner posts indicated at 20, preferably constructed of sheet metal, as shown in Figs. 6 and 7. Each post has a curtain groove 20$^a$ formed by the folding of the sheet metal of the post, and at the lower end has a horizontal flange 20$^b$ with its edge shaped to fit snugly against the body or base of the wind shield to form a tight joint. The metal of the post at the upper end, where it forms the curtain guide is slit vertically to enable a portion of the outer wall to be drawn outwardly to provide a horizontal flange 20$^c$, which is secured by a bolt 21 to the horizontal top rail and the inner wall of the curtain groove is also slitted to enable the upper end of the back wall of the curtain groove to be flared slightly forward, as indicated at 20$^d$ and the inner flange of the groove to be rolled over at its upper edge, as already described in connection with the center post panel. The bottom end of the post is provided with a vertically depending lug 20$^e$ apertured for the passage of a bolt for securing the lower end of the post to the body. The front cross bar hereinbefore described, depends over the upper edge of the wind shield, as shown, and to make a draft and moisture proof joint and to prevent rattling I secure a flap or strip 22 to the rear edge of the front cross bar 5, against which the upper edge of the wind shield strikes and which flap depends sufficiently below the upper edge of the wind shield to form an effective cushioned closure.

Motor vehicle bodies carry at the rear a finishing or trimming bar of wood, indicated at 23, which serves for the connection of the upholstery. Such strips vary somewhat in their position and I adapt my back curtain to be readily attached to such bar irrespective of its position and in a manner to effect a tight joint. The back curtain is indicated at 24 and the means referred to consists in securing to the inner face of the lower edge of the curtain a flexible strip or flap 25, secured to the lower edge of the back curtain by a double row of stitching indicated at 25$^a$, the back curtain material being turned over the lower edge of the strip 25 to form a finished edge. The free edge of the flap 25 is applied to the strip 23 in a manner to place the requisite tension upon the back curtain and is tacked to said strip as indicated at 25$^b$.

The cross rod or wire 16 at the bottom of the curtain and the tubular or channeled portion of the strip 15 encircling it extends into the guides for the curtain and sustains the said curtain against bulging under wind pressure and disengaging from the guides.

It will be observed that the portion of the metal strip 15 below the channeled part does not extend into the guides and thus it in effect provides a pivoted flap or member at the lower end of the curtain, said flap pivoting about the rod 16 as a center and by this swinging or pivotal movement the flap may be swung to be engaged with or disengaged from the catch 17.

It will be understood that my top is readily adaptable to a roadster body by simply omitting the intermediate posts and one set of curtains and correspondingly shortening the top.

What I claim is:—

1. In a storm top for vehicles, a cover carrying frame, rear quarter members connecting said frame with the motor vehicle body and having glass receiving grooves, front bars detachably connected to said rear members for removably holding the glass therein and carrying curtain guides, and side posts connected respectively to the cover frame and vehicle body and also having curtain guides, and curtains carried by said cover frame adapted to travel in said guides.

2. In combination with a vehicle body having vertically extending body irons for a folding top, a storm top comprising a rigid deck, rear quarter members detachably connected to said deck, and bracket irons for detachably and adjustably connecting said quarter members to said vertically extending irons, said bracket irons each having at one end a portion lying in a vertical plane provided with a horizontally elongated slot receiving a bolt for securing it to the quarter member, and at its other end a portion lying in a horizontal plane and provided with a horizontal slot receiving said vertically extending body iron, and clamping nuts threaded on said horizontal portion and clamping it therebetween.

3. In combination with the body and the storm top, curtain guides, a rod extending transversely of the curtain at its lower end, a metal plate or strip having a pocket receiving the lower edge of said curtain and receiving also the rod to hold the curtain in said pocket, said rod extending into the curtain guides, and said plate or strip having swinging movement about said rod, means on the body to engage a part of said plate or strip, said plate or strip by its swinging movement engaging or disengaging said means, substantially as described.

4. In combination a body or storm top, curtain guides, a curtain having a metal plate or strip at its lower end adapted to have swinging movement in relation to the main part of the curtain, which is held by said guides, and catch means on the body to engage or disengage the said swinging plate, substantially as described.

In testimony whereof I affix my signature in the presence of a witness.

WILLIAM A. HUNTER.

Witness:
BENNETT S. JONES.